United States Patent [19]
Holden et al.

[11] Patent Number: 5,182,490
[45] Date of Patent: Jan. 26, 1993

[54] LIGHT SOURCES

[75] Inventors: John G. Holden, Hemel Hempstead; Ian A. Shanks, Penn, both of Great Britain

[73] Assignee: Thorn EMI plc, London, England

[21] Appl. No.: 563,755

[22] Filed: Aug. 7, 1990

[30] Foreign Application Priority Data

Aug. 8, 1989 [GB] United Kingdom ............ 8918114

[51] Int. Cl.[5] ............................ H01J 1/70; H01J 5/04
[52] U.S. Cl. .................................... 313/485; 313/489; 313/493; 428/690; 220/2.1 R
[58] Field of Search ............ 313/485, 486, 489, 493; 252/301.16; 428/690; 220/2.1 R

[56] References Cited

U.S. PATENT DOCUMENTS

| | | | |
|---|---|---|---|
| T861,024 | 4/1969 | Bloom et al. | 252/301.16 |
| 3,358,167 | 12/1967 | Shanks | 313/25 |
| 3,720,826 | 3/1973 | Gillmore et al. | 313/25 X |
| 4,678,966 | 7/1987 | Mager | 313/486 X |
| 4,691,140 | 9/1987 | Sakakibara et al. | 313/486 |
| 4,751,148 | 6/1988 | Popma et al. | 428/690 |
| 4,859,903 | 8/1989 | Minematu et al. | 313/486 X |
| 4,911,830 | 3/1990 | Bromley et al. | 252/301.16 |

Primary Examiner—Donald J. Yusko
Assistant Examiner—Ashok Patel
Attorney, Agent, or Firm—Fleit, Jacobson, Cohn, Price, Holman & Stern

[57] ABSTRACT

A fluorescent tube (2) is made of a plastics material containing at least one organic fluorescent dye and attached to the inner surface of this tube is a barrier layer (3) for absorbing ultraviolet radiation, and attached to the inner surface of the layer (3) there is a phosphor layer (3a).

11 Claims, 1 Drawing Sheet

LIGHT SOURCES

FIELD OF THE INVENTION

This invention relates to light sources, and it relates in particular to such light sources as utilise the mechanism of fluorescence to generate part at least of their light output.

BACKGROUND OF THE INVENTION

Hitherto, light sources based upon the use of fluorescence have typically exhibited problems in a number of areas, such as cost (particularly if specific colour rendition of good quality is desired), longevity and design flexibility.

OBJECT OF THE INVENTION

Some of the aforementioned problems have their origins in different aspects of conventional light sources but the present invention, by adopting a wholly different approach to the construction of and materials used in such sources, aims to provide light sources in which at least one of the above-mentioned problems is reduced.

SUMMARY OF THE INVENTION

The use of plastics containing at least one organic, fluorescent dye as a basic constructional material for light sources in accordance with the invention assists in reducing the costs associated with obtaining good and reliable colour rendition as compared, for example, with the costs associated with conventional fluorescent light sources which incorporate powdered phosphors which emit light of characteristic wavelengths when excited by (typically) a mercury vapour discharge.

It is sometimes preferred, when attempting to generate so-called "white" light, to utilise three different phosphors, each of which fluoresces to emit light of a respective one of the primary colours. Currently, for good reliable colour rendition, it is necessary that a light source incorporates phosphors containing expensive rare-earth dopants, and that each of the phosphors emits light which is substantially invariant in amplitude and wavelength.

The present invention avoids the need for some at least of such expensive raw materials yet still provides light sources exhibiting good colour rendition because of the useful and reproducible spectral characteristics of light generated by organic fluorescent dyes.

A further advantage which accrues from the use of plastics, instead of glass, as the basic constructional material of light sources in accordance with the invention, lies in the flexibility of design that is achievable. Light sources can be made in very many shapes once it is possible to avoid the constraints imposed by the use of glass.

The plastics material is, in accordance with the invention, sealed by the application thereto of an inorganic barrier layer, typically of phosphate glass, that can be deposited in any convenient manner once the shaping of the plastics material to a desired form has been completed. Such deposition of the barrier layer can be effected by low temperature processes that do not adversely effect the shape of the plastics material.

The second layer may comprise phosphor powder or, alternatively, a phosphate glass layer incorporating phosphor powder.

The light source may also include a further barrier layer for absorbing ultra violet radiation and arranged to overlie the first layer comprising the plastics material. The use of the further barrier layer reduces the attendant risk of decomposition of the plastics material or of the organic dye or dyes therein from ambient ultra violet radiation to which the light source may be exposed.

Preferably, the light source includes end caps for forming closure members for the region containing the excitation means, the end caps having threaded portions for co-operating with threaded portions of the plastics material.

In a further embodiment, reflector means is provided for shielding the second layer from heat generated by a thermionic electron source of the excitation means.

BRIEF DESCRIPTION OF DRAWINGS

In order that the invention may be clearly understood and readily carried into effect, one embodiment thereof will now be described with reference to the accompanying drawings of which.

DESCRIPTION OF PREFERRED EMBODIMENT

Figure 1:
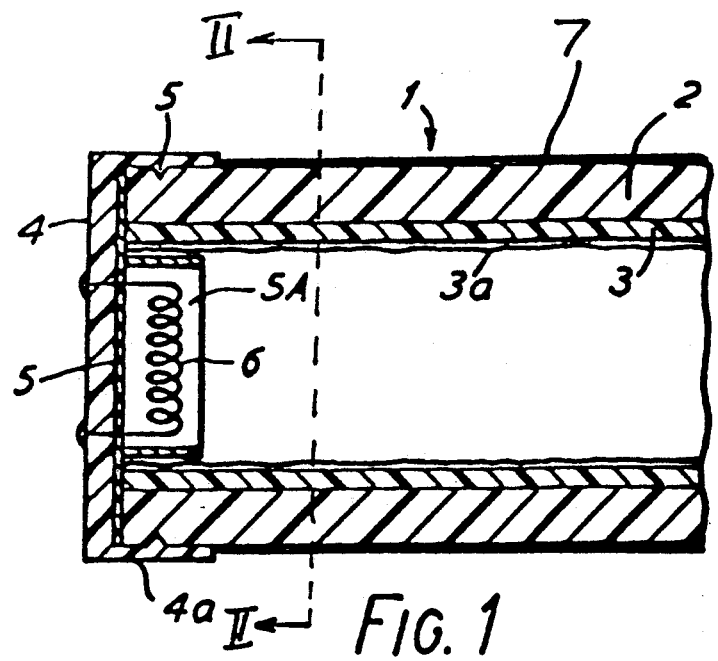
FIG. 1 shows a longitudinal schematic cross-sectional view of part of a light source in accordance with one example of the invention.
Figure 2:
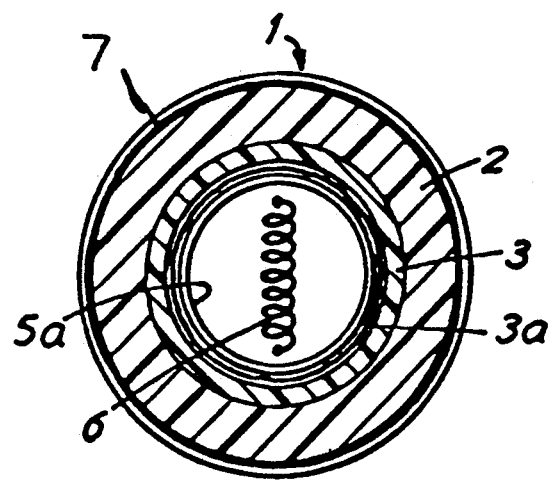
FIG. 2 shows a transverse cross-section through the light source of FIG. 1, taken on view arrows II—II thereof.

Referring now to the drawings, a tubular light source is indicated generally at 1. In this example, the light source 1 comprises a linear tube but this need not be the case, and one of the advantages of this invention, as has already been mentioned, is the ease with which various configurations including flat panels may be constructed.

The tube comprises a first layer 2 of plastics material, such as polycarbonate, incorporating two organic fluorescent dyes. Inside the layer 2, and closely juxtaposed therewith, is a barrier layer 3 which is formed of phosphate glass, on the inner (exposed) surface of which is deposited a second layer in the form of a powdered phosphor material 3a. The phosphate glass is conveniently $Al^{3+}$ or $Fe^{3+}$ phosphate, deposited from a solution of $Al(NO_4)_3$ or $Fe(NO_4)_3$ and anhydrous phosphoric acid in anhydrous methanol and baked for around 1 hour at about 80° C. The inter-relationship of the wavelengths of light emitted by the two dyes in layer 2 and the powdered phosphor material 3a and the manner of their excitation will be described more fully hereinafter. The powdered phosphor material 3a and any binder/suspending agent associated therewith is preferably anhydrous to minimise the rigours of a subsequent baking process.

The tube is provided with end caps such as 4 which are required to be impermeable and are hermetically sealed to and act as closure members for the tube 1.

The end caps such as 4 can conveniently be attached initially to the tube by means of a coarse, single turn screw thread 5 co-operative parts of which are formed in the outward facing surface of the plastics material of the layer 2 and the inward facing surface of an axially extending part 4a of the end cap 4. A gasket 5 of porous material which can be loaded in-situ with a suitable solvent for the materials of end cap 4 and plastics layer 2, or which will chemically bond or adhere to one or both of these, is inserted between these two components in order to permit the end cap to be effectively welded to the tube, forming an hermetic seal. The solvent may be one which requires a small degree of heat treatment to ensure its full operation.

The end caps such as 4 have to be impermeable, as already mentioned, and to this end they are conveniently formed either of a material such as soda glass, which is impermeable of itself, or of a permeable material such as polycarbonate which is rendered impermeable by the application of a layer of suitable material such as phosphate glass. In this latter case, however, appropriate measures have to be taken to ensure that the polycarbonate material is not deformed or otherwise damaged by the temperature to which filament leads which pass therethrough are subjected in use.

The end caps such as 4 may be formed with inwardly extending and self-supporting reflector cylinders such as 5a to shield the layer 3 and the general area adjacent the seal between end cap 4 and the tube from the heat generated by the operation of a conventional thermionic electron source electrode 6 which, in combination with a conventional fill within a core region of the tube 1, provides an excitation means for the phosphor material 3a, as described below. The reflector 5a is conveniently made of aluminium, although other materials may be used if desired. Furthermore, the reflector 5a need not be self supporting or attached to the end cap 4 and may instead be provided in the form of a layer deposited on the powdered phosphor material 3a or, if the material 3a is locally removed, on the layer 3 of phosphate glass.

Enclosed within the core region of the tube 1 is a conventional fill comprising an inert gas and mercury vapour this fill being introduced in the usual way via an exhaust tubulation (not shown) in one of the end caps. The fill supports, in known manner, a discharge when the source electrode 6 is energised, the discharge giving rise to ultra violet radiation for exciting the phosphor material 3a. Other fills, containing for example, deuterium and/or tritium may be used if desired.

The powdered phosphor material 3a is chosen so as to absorb substantially all of the ultra violet radiation generated by the discharge in the tube and to generate by fluorescence, in response to such absorption, visible blue light. This blue light is in turn incident upon the enveloping layer 2 which contains organic dyes arranged to generate by fluorescence red and green light respectively.

The dye concentrations in the layer 2 are arranged so that some of the blue light generated by the powdered phosphor material 3a is not absorbed and can emerge directly from the light source 1. A chosen arrangement of dyes, phosphors and relative quantities thereof can therefore be used to define a given colour rendition for the light source 1.

The use of plastics material, such as polycarbonate, as the host material for the dyes of layer 2 is advantageous in that it is relatively inexpensive and is easily formed into various shapes. Furthermore, the organic dyes are relatively inexpensive and reliable in colouration. Dye-loaded plastics materials have, however, two major disadvantages when considered for use in a lighting environment such as that described herein, namely a susceptibility to degradation of the dyes and the plastic (by decomposition) if exposed to the ultra violet radiation generated by the gaseous discharge over prolonged periods and a tendency to be porous, thus permitting undesirable ingress and egress of gaseous components.

In the construction of this embodiment of the invention, both disadvantages are addressed by the use of the phosphate glass layer 3 and the phosphor material 3a; the susceptibility to ultra violet degradation being overcome by ensuring that the phosphor material in layer 3a absorbs substantially all of the ultra violet radiation generated as a result of the discharge (in particular that radiation of wavelength 254 nm and 185 nm). The porosity of the plastics layer 2 is overcome by the use of the impermeable phosphate glass material as layer 3. Phosphate glass acts as a sealant and, advantageously, requires low processing temperatures that are compatible with and not damaging to the integrity of layer 2. It also acts as an ultra violet filter at wavelengths of 254 nm and 185 nm, and thus removes any such radiation not absorbed by the powdered phosphor 3a.

In an alternative construction, the powdered phosphor material 3a is incorporated in a glassy support layer, which may be an ultra violet translucent phosphate glass, and a separate ultra violet absorbent is additionally provided in the phosphate glass layer 3.

In any event, it is desirable (though not essential) to provide an outer barrier layer 7 to prevent external ultra violet radiation, such as from ambient sunlight, from impinging upon and thus damaging the layer 2 over a prolonged period of time. Conveniently this outer barrier layer 7 can be of phosphate glass, or other known ultra violet absorbing material, applied as a final stage of the lamp production process when the physical shape and configuration of the light source have been defined. The layer may, if desired, contain an additive to increase its ultra violet absorption capabilities.

A significant advantage accrues from the use of the powdered phosphor material 3a, as opposed to using a third organic dye, in that it assists in liberating some of the light generated in layer 2 which becomes trapped therein by total internal reflection. The light so entrapped eventually encounters a powder particle and is scattered thereby at angles allowing it to escape from the tube. This mechanism greatly enhances the brightness and efficiency of the light source 1. It is not, however, essential to use a powdered phosphor material such as 3a. If the phosphor is applied as a thin film, for example, it is desirable for the plastics layer to contain a scattering pigment such as titania to reduce entrapment of light.

It will be appreciated that, in the described embodiment, where white-light is assumed to be generated, the powdered phosphor material 3a is usually a blue phosphor because it has to excite fluorescence in the organic dyes in layer 2 and the physics of fluorescence dictates that a shift to longer wavelength radiation occurs. Thus the blue phosphor is excited by the predominance of ultra violet radiation in the mercury discharge and the blue light so generated excites the red and green organic dyes in layer 2. Some of the green light generated in layer 2 may also excite the red dye and thus the balance of amounts of powdered phosphor material 3a and red and green dyes in layer 2 are chosen to achieve a desired colour rendition in the light emitted by the source 1 as a whole.

If white light is not the objective, the powdered phosphor material 3a need not generate blue light on fluorescence and the layer 2 need not contain two organic dyes. For example, a single dye might be sufficient for some colourations. Thus a green phosphor might pump a layer having a red dye to provide a red, orange or yellow emission from the light source 1 as a whole.

It may also be advantageous to load the phosphate glass layer 3 with an ultra violet absorber to further reduce the risk of impingement of ultra violet radiation on the layer 2 with the attendant risk of decomposition of the layer 2 or of the organic dye or dyes therein.

The dye or dyes incorporated in the layer 2 are preferably of high purity to reduce still further their susceptibility to decomposition.

Although the invention has been described with respect to an embodiment in which a full length mercury discharge occurs in the tube, this need not be the case and the invention can be applied to any light source in which fluorescence is to be excited. For example, the invention can be used with so-called "negative glow" low pressure discharge tubes.

We claim:

1. A light source comprising
   a) a hollow support body made of a first main layer of plastics material containing at least one organic fluorescent dye, a second layer of inorganic material deposited on the inner surface of said first layer, and a third layer of a phosphor material attached to the inner surface of the second layer;
   b) thermionic electron source excitation means;
   c) fixing means for fixing said thermionic electron source excitation means to said support body;
   said second layer of inorganic material serving as a barrier layer for absorbing ultraviolet radiation generated by said excitation means.

2. A light source according to claim 1 wherein the second layer is a gas-impermeable layer.

3. A light source according to claim 1 wherein the second layer is a phosphate glass.

4. A light source according to claim 1 wherein the phosphor material is phosphor powder.

5. A light source according to claim 2 wherein the phosphor material is a phosphor powder.

6. A light source according to claim 3 wherein the phosphor material is a phosphor powder.

7. A light source according to claim 1 wherein the phosphor material is a phosphate glass layer incorporating phosphor powder.

8. A light source according to claim 2 wherein the phosphor material is a phosphate glass layer incorporating phosphor powder.

9. A light source according to claim 3 wherein the phosphor material is a phosphate glass layer incorporating phosphor powder.

10. A light source according to claim 1, wherein the phosphor material is a phosphate glass layer containing phosphor powder and an ultraviolet absorbant is provided in the second glass.

11. A light source according to claim 1 wherein the support body contain two organic fluorescent dyes for providing, respectively, in response to excitation thereof, red and green light, and the third layer comprises a phosphor material for providing, in response to excitation by the excitation means, blue light for causing the excitation of the two organic fluorescent dyes, thereby to provide a light source for generating white light.

* * * * *